3,696,000
Patented Oct. 3, 1972

3,696,000
PROCESS FOR THE PRODUCTION OF ALKALINE PROTEINASE
Guido M. Miescher, Terre Haute, Ind., assignor to Commercial Solvents Corporation
No Drawing. Filed Sept. 10, 1970, Ser. No. 71,236
Int. Cl. C12d 13/10
U.S. Cl. 195—65                                    2 Claims

ABSTRACT OF THE DISCLOSURE

An improved process for the production of alkaline proteinase by the cultivation of a *Bacillus subtilis* type of organism on a nutrient fermentation medium by continuously introducing carbohydrate to the fermentor after the 14th hour to the end of the fermentation, thereby producing greatly improved yields of proteinase.

BACKGROUND OF THE INVENTION

This invention relates to an improved process for the production of alkaline proteinase. In a particular aspect, this invention relates to an improved process for the production of alkaline proteinase by the cultivation of a *Bacillus subtilis* type of organism on a nutrient fermentation medium.

The production of various proteolytic enzymes by *B. subtilis* has long been known. Of these enzymes, the one designated alkaline proteinase (or protease) is widely used in detergent formulations. An early process for the production of this material was described by Wallerstein, U.S. Pat. 1,985,267 using a fermentation medium based on proteins, carbohydrates and minerals. Several improvements have been suggested by subsequent investigators. In recent years carbohydrate content as high as 22 g./100 ml. (about the maximum the organism can tolerate) has been employed in the starting medium and yields in the range of from 15,000–25,000 units per ml. have been achieved (a unit is defined as the amount of enzyme which produces in one minute in a solution containing sodium tripolyphosphate at a pH of 8.6 and at a temperature of 37° C., a hydrolyzate whose absorbance at 277 m$\mu$ is the same as the absorbance of a tyrosine solution containing 1.50 $\mu$g. tyrosine per ml.).

Presently the submerged growth method with mechanical agitation and aeration is generally used and fermentation periods of 40–72 hours are common. The proteinase is readily recovered by filtering the broth at the end of the fermentation period, adjusting the pH to about neutral, precipitating the enzyme by adding 2–3 volumes of methanol or ethanol, and separating the precipitate by filtration.

The foregoing process has been very successful, but increased yields are important in view of the plant investment.

SUMMARY OF THE INVENTION

It is an object of this invention to provide an improved process for the production of alkaline proteinase.

It is another object of this invention to provide an improved process for the production of alkaline proteinase by the cultivation of a *Bacillus subtilis* type of organism on a nutrient fermentation medium by the submerged growth method.

Other objects of this invention will be apparent to those skilled in the art from the disclosure herein.

It has been discovered that in a process for the production of alkaline proteinase by the cultivation of a *Bacillus subtilis* type of organism on a nutrient fermentation containing a nitrogen source, a carbohydrate source, and a source of minerals and trace element at a pH of 6.0 to 6.5, greatly improved yields are obtained by using a fermentation medium containing about 11–12 g./100 ml. of carbohydrate, compared with 20–22 hitherto used, then, at about the 14th hour of fermentation, continuously feed additional carbohydrate at a rate of approximately 0.25–0.35 g./100 ml. per hour to the end of the fermentation. Furthermore it has been discovered that superior yields are obtained when the additional carbohydrate is supplied by enzymatically-converted glucose molasses, which is defined as the residual concentrated mother liquor obtained from the manufacture of glucose, using the enzymatic conversion of starch to glucose process.

DETAILED DISCUSSION

According to the improvement of the present invention, a nutrient fermentation medium is prepared as known in the art containing 11–12 g./100 of carbohydrate. The initial carbohydrate can be supplied by any convenient source known in the art, such as starch hydrolyzate, glucose, etc. A preferred carbohydrate source is glucose molasses, as hereinbefore defined.

A nitrogen source is added to the extent of about 1.5 g./100 ml. of protein. The nitrogen can be supplied by any previously known sources such as soy bean flour, yeast, steep liquor and the like or combinations thereof. Inorganic nitrogen can also be supplied, and minerals such as potassium, magnesium, iron, manganese and phosphorous are then added, as is known in the art.

The nutrient medium so prepared is sterilized by known procedures, e.g. by heating to about 115–120° C. for 15 to 30 minutes, and after cooling to ambient temperatures is inoculated with a *Bacillus subtilis* like organism known to be a producer of alkaline proteinase.

The *B. subtilis* designation encompasses a group of organisms generally believed to be of a single species but which can exhibit considerable variation in their ability to produce alkaline proteinase. For this reason the strain used for proteinase production is selected for its ability to produce high proteinase yields by comparison with other strains tested. The technique for making the selection is known and is well witin the ability of those skilled in the art. Cultures of *B. subtilis* are available from public repositories, or they can be isolated from nature and from these sources a satisfactory alkaline proteinase-producing strain can be selected. It is not intended, therefore, that the practice of this invention be limited to a particular strain of *B. subtilis* for improved yields of alkaline proteinase are obtained by employing the improvement of this invention with any proteinase-producing strain of *B. subtilis*.

After inoculation of the fermentation medium, aeration and mechanical agitation is commenced in accordance with the previous process. The pH is monitored and is maintained within the range of 6.0 to 6.5 with ammonia. After the fermentation has been in progress for about 14 hours, continuous feeding of additional carbohydrate is started. Glucose molasses as hereinbefore described is particularly preferred for this step for, surprisingly, yields are much greater than when glucose alone is fed. The time to start the carbohydrate feeding is determined by following periodically, i.e. usually hourly, the glucose content in the fermentation medium. After the glucose content has been depleted for 1–2 hours, usually 13–15 hours after the beginning of the fermentation, feeding of additional carbohydrate is started at a constant feed rate of approximately 0.25–0.35 g./100 ml. carbohydrate per hour. This feed rate is maintained to the end of the fermentation. The pH of the fermentation medium is maintained in the range of 6–6.5 with an occasional addition of ammonia to prevent it from falling below 6.0. Thus at a total fermentation time of from 40 to 60 hours, an additional 6 to 16 g./100 ml. carbohydrate are fed to the fermentation for a total of about 18–28 g./100 ml.

The end of the fermentation is determined by periodically assaying the proteinase content of the liquid and in doing so determining when proteinase synthesis levels off. When proteinase production has largely ceased, the alkaline proteinase is recovered according to the prior process, as follows. The fermentor contents are filtered and the filtrate is treated with char when desired. The pH is adjusted to about 5.5 and the filtrate is then diluted with 2 to 3 volumes of methanol. The resulting precipitate of alkaline proteinase is filtered, washed with methanol and dried by vacuum drying.

The enzymatically-converted glucose molasses which is a preferred carbohydrate source for the practice of this invention is commercially available. The product sold under the designation Enzose by CPC International is particularly preferred.

The invention will be better understood with reference to the following examples. These examples are intended only to further illustrate the invention and it is not intended that it be limited thereby.

EXAMPLE 1

A nutrient medium was prepared with the following ingredients:

| | |
|---|---|
| Glucose molasses | 15 g./100 ml. |
| Soybean flour | 2. |
| Corn steep liquor (50% solids) | 2. |
| $CaCO_3$ | 0.6. |
| $KH_2PO_4$ | 0.6. |
| $MgSO_4.7H_2O$ | 0.15. |
| Tap water, to make | 10 liters. |

The glucose molasses used in the above formula was Enzose, marketed by CPC International. It contains 75% by weight of carbohydrates of which 50% is glucose. At 15 g./100 ml. it provides a concentration of carbohydrate of 11.5 g./100 ml., 100% basis. The soybean flour used was a mildly toasted flour marketed by Archer-Daniels-Midland Co. under the name Baker's Nutrisoy Flour. The pH of the medium was adjusted to 5.8 with aqueous ammonia and 3 ml. of an antifoam agent (K-67 manufactured by Hodag Chemicals Company) were added.

After sterilizing the medium in an autoclave for 30 minutes at 120° C. and transferring it to a previously sterilized fermentor, the cooled medium was inoculated with 400 ml. of an actively growing culture of the alkaline proteinase producing culture of B. subtilis.

The fermentation was started under the following conditions:

| | |
|---|---|
| Temperature | 37° C. |
| Aeration | 6 liters/min. |
| Agitation | 1–5 inch diameter impellor at 650 r.p.m. |
| Antifoam | As needed. |
| pH control | Automatic, 6.0 with $NH_3$ gas. |

After 14 hours of fermentation the carbohydrate feeding was started with a sterilized aqueous solution containing 1800 g. of glucose molasses diluted to 2100 ml. total volume which is equivalent to 13.5 g./100 ml. of carbohydrates based on the volume of the medium at the beginning of the fermentation. The feed rate was adjusted to a rate of 60 ml. per hour. The proteinase synthesis rate was monitored by known methods and maximum alkaline proteinase activity was found after 48 hours of fermentation at which time the fermentation was terminated; 10,500 ml. of broth were harvested containing 35,000 units/ml. proteinase activity.

The above experiment was repeated in all essential details except that the initial carbohydrate content of the medium was 20 g./100 ml. and no additional carbohydrate was administered during the fermentation. This concentration was close to the maximum which the organism could tolerate without being adversely affected. The titre leveled off after 45 hours at 22,000 units/ml.

EXAMPLE 2

The experiment of Example 1 was repeated in all essential details except that glucose was substituted for glucose molasses, gram for gram on a 100% basis, in both the initial fermentation medium and in the additional feed starting at the 14th hour. The titre leveled off after 46 hours at 19,000 units/ml.

EXAMPLE 3

The experiment of Example 1 is repeated in all essential details except that glucose is substituted for glucose molasses only in the initial fermentation medium. At the 14th hour, glucose molasses is fed to the fermentation in accordance with Example 1. A high yield of alkaline proteinase is obtained.

I claim:

1. In a process for the production of alkaline proteinase by the cultivation of a Bacillus subtilis type organism on a nutrient fermentation medium containing a carbohydrate source, a nitrogen source, and essential minerals in the presence of aeration and agitation at a pH of 6–7 at a temperature of about 37° C. for a period of 35 to 72 hours thereby producing a fermented broth containing alkaline proteinase and recovering said proteinase by filtering said broth, and precipitating said proteinase by dilution with 2 to 3 volumes of methanol per volume of broth and separating said precipitated proteinase, the improvement comprising the step of continuously adding additional carbohydrate at the rate of 0.25–0.35 g./100 ml. per hour in the period from about the 14th hour to the end of the fermentation.

2. The process of claim 1 wherein the additional carbohydrate is supplied as enzymatically-converted glucose molasses.

References Cited

UNITED STATES PATENTS 3,623,956   11/1971   Kalabokias _____ 195—66 R

LIONEL M. SHAPIRO, Primary Examiner

U.S. Cl. X.R.

195—115

UNITED STATES PATENT OFFICE
CERTIFICATE OF CORRECTION

Patent No. 3,696,000              Dated October 3, 1972

Inventor(s) Guido M. Miescher

It is certified that error appears in the above-identified patent and that said Letters Patent are hereby corrected as shown below:

Column 2, line 19 "g/100" should be --g/100 ml--

Column 2, line 43 "witin" should be --within--

Signed and sealed this 22nd day of May 1973.

(SEAL)
Attest:

EDWARD M. FLETCHER, JR.
Attesting Officer

ROBERT GOTTSCHALK
Commissioner of Patents